E. TESSIER.
HORSESHOEING RACK.
APPLICATION FILED MAY 26, 1910.

988,407.

Patented Apr. 4, 1911.
2 SHEETS—SHEET 1.

Witnesses

Inventor
Eugene Tessier

Inventor
Eugene Tessier

UNITED STATES PATENT OFFICE.

EUGÈNE TESSIER, OF NEW BEDFORD, MASSACHUSETTS.

HORSESHOEING-RACK.

988,407. Specification of Letters Patent. Patented Apr. 4, 1911.

Application filed May 26, 1910. Serial No. 563,479.

*To all whom it may concern:*

Be it known that I, EUGÈNE TESSIER, a subject of the King of Great Britain, residing at New Bedford, in the county of Bristol and State of Massachusetts, have invented certain new and useful Improvements in Horseshoeing-Racks; and I do declare the following to be a full, clear, and exact description of the invention, such as will enable others skilled in the art to which it appertains to make and use the same.

This invention relates to improvements in horse shoeing racks or horse clipping racks.

One object of the invention is to improve the construction of horse shoeing racks whereby the animal may be securely held and raised from the ground while being shod or clipped.

Another object is to provide a rack adapted to be swung open to receive the animal and afterward closed up and fastened together in operative position.

With these and other objects in view, the invention consists of certain novel features of construction, combination and arrangement of parts as will be more fully described and particularly pointed out in the appended claim.

Figure 1:
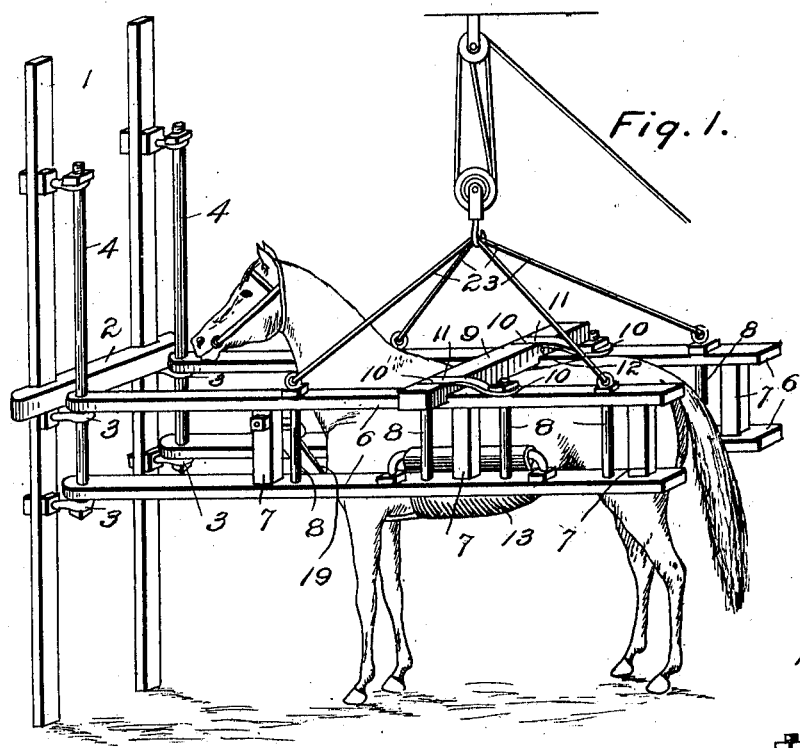
Figure 2:
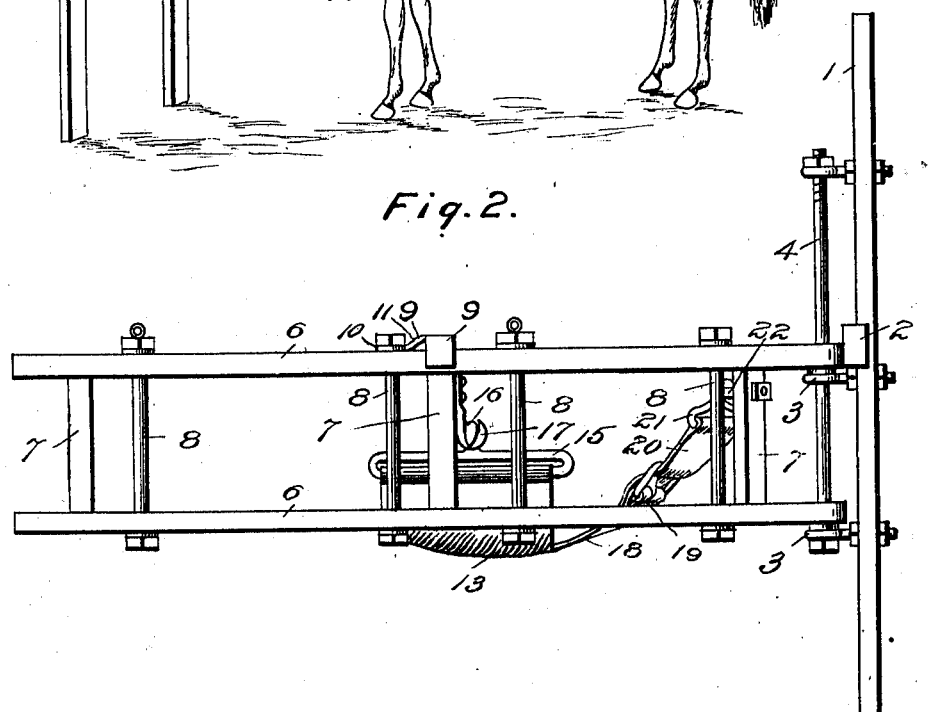
Figure 3:
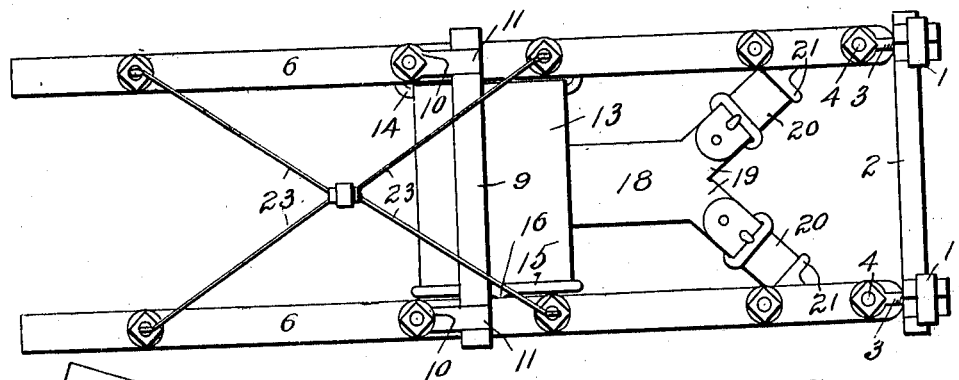
Figure 4:
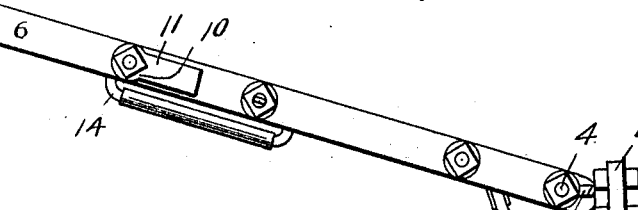
Figure 5:
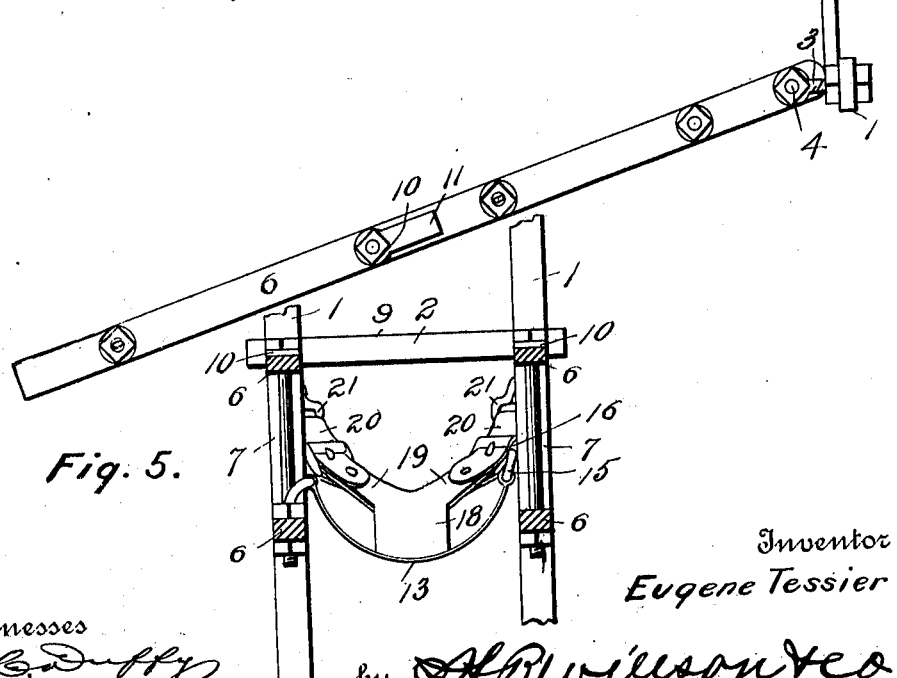

In the accompanying drawings; Figure 1 is a perspective view of my improved horse shoeing rack showing the parts arranged in position for use and engaged with a horse; Fig. 2 is a side view locking toward the side opposite to that shown in Fig. 1; Fig. 3 is a top plan view of the device with the horse removed and the parts arranged as shown in Fig. 1; Fig. 4 is a similar view with the parts swung open to an inoperative position; and, Fig. 5 is a detail vertical sectional view.

In the embodiment of the invention I provide two uprights or supporting posts 1 which are adapted to be secured to a wall or any other support and are connected together and held in spaced relation by means of a cross bar 2 connected thereto as shown. Connected to the front sides of the upright bars 1 and spaced at a suitable distance from the bars by eyes 3 or other fastening devices are parallel guide bars or rods 4 with which are slidably and pivotally engaged the opposite side members 5 of the rack.

The side members 5 of the rack consists of upper and lower side bars 6 which are spaced apart by a series of vertical spacing bars 7 and are connected together by a series of tie bolts or rods 8. When the side members 5 are brought into parallel relation along the opposite sides of the animal said members are secured in this position by a connecting cross bar 9, having formed in its lower side mortises adapted to engage the upper sides of the upper bars 6 of the side members. The cross bar 9 is preferably held in position by clamping washers 10 arranged on the upper ends of the adjacent tie bolts 8 and having formed thereon offset lugs 11 which engage notches 12 formed in the upper side of the cross bar as shown. The cross bar 9 when thus engaged with the side members passes over and is disposed a suitable distance above the back of the animal.

Arranged in the rack between the side members 5 is a supporting harness comprising a broad belly band 13 formed of heavy leather or strong suitable fabric. One end of the band is attached to a loop 14 secured to the lower bar 6 of one of the side members of the rack. In the opposite end of the band is arranged a metal loop 15 having formed thereon a hook 16 which is adapted to be detachably engaged with a hook 17 secured to the central spacing bar 7 of the opposite side member of the rack after the band has been passed beneath the animal. Secured to the forward edge of the band is a breast engaging strap 18 having branching outer ends 19 provided with buckles or other suitable connecting devices with which are adjustably connected the straps 20 of the supporting hooks 21 which are adapted to be detachably engaged with eyes 22 arranged in or secured to the front spacing bars 7 of the opposite side members of the frame. The breast strap 18 is passed around the chest before the hooks 21 are engaged with the eyes 22 and when thus arranged the said breast strap together with the band 13 will form an efficient swing or harness for lifting and supporting the animal at the desired elevation above the ground.

Connected to the side members 5 of the rack in any suitable manner are hoisting chains or cables 23 which pass through suitable hoisting blocks and may be operated by hand or connected with any suitable hoisting mechanism (not shown).

In the use of my improved rack the cross bar 9 is removed and the band 13 and breast strap hooks disengaged from their eyes or fastenings after which the side members of the rack are swung open or apart to such a distance that a timid or fractious horse may be readily led into position after which the side members are swung together and secured in operative position at each side of the horse. The belly band is then brought under and secured to its fastening hook 17 after which the breast strap is brought into position and the hooks thereon engaged with their fastening eyes. When the parts have thus been arranged and secured the hoisting mechanism is operated to lift the rack together with the horse confined therein to a suitable elevation to hold the same thus suspended while the shoeing operation is performed. When the rack is thus hoisted the side bars thereof will readily slide upwardly on the guide rods 4 as will be readily understood.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

In a horse shoeing rack, a pair of upright supporting bars, a rack comprising side members each consisting of upper and lower side bars, said bars being mounted at one end upon the supporting bars for pivotal and vertical sliding movement, a transverse connecting bar arranged at its end upon the upper side bars of the rack members, bolts connecting the bars of each of said members, clamping plates fixed at one end upon said bolts, said connecting bar having recesses therein to receive the free ends of said plates to yieldingly retain the connecting bar in position, said bar being adapted to extend over the animal's back, when arranged between said side members, a belly band connected to said lower side bars, and means for hoisting the rack and animal confined therein.

In testimony whereof I have hereunto set my hand in presence of two subscribing witnesses.

EUGÈNE TESSIER.

Witnesses:
 ALFRED R. LANGLOIS,
 WILLIAM DESSERT.

---

Copies of this patent may be obtained for five cents each, by addressing the "Commissioner of Patents, Washington, D. C."